May 8, 1951  A. R. THOMPSON  2,551,981
CONVEYER MECHANISM FOR PRESSURE COOKERS
Original Filed April 20, 1942  4 Sheets-Sheet 1
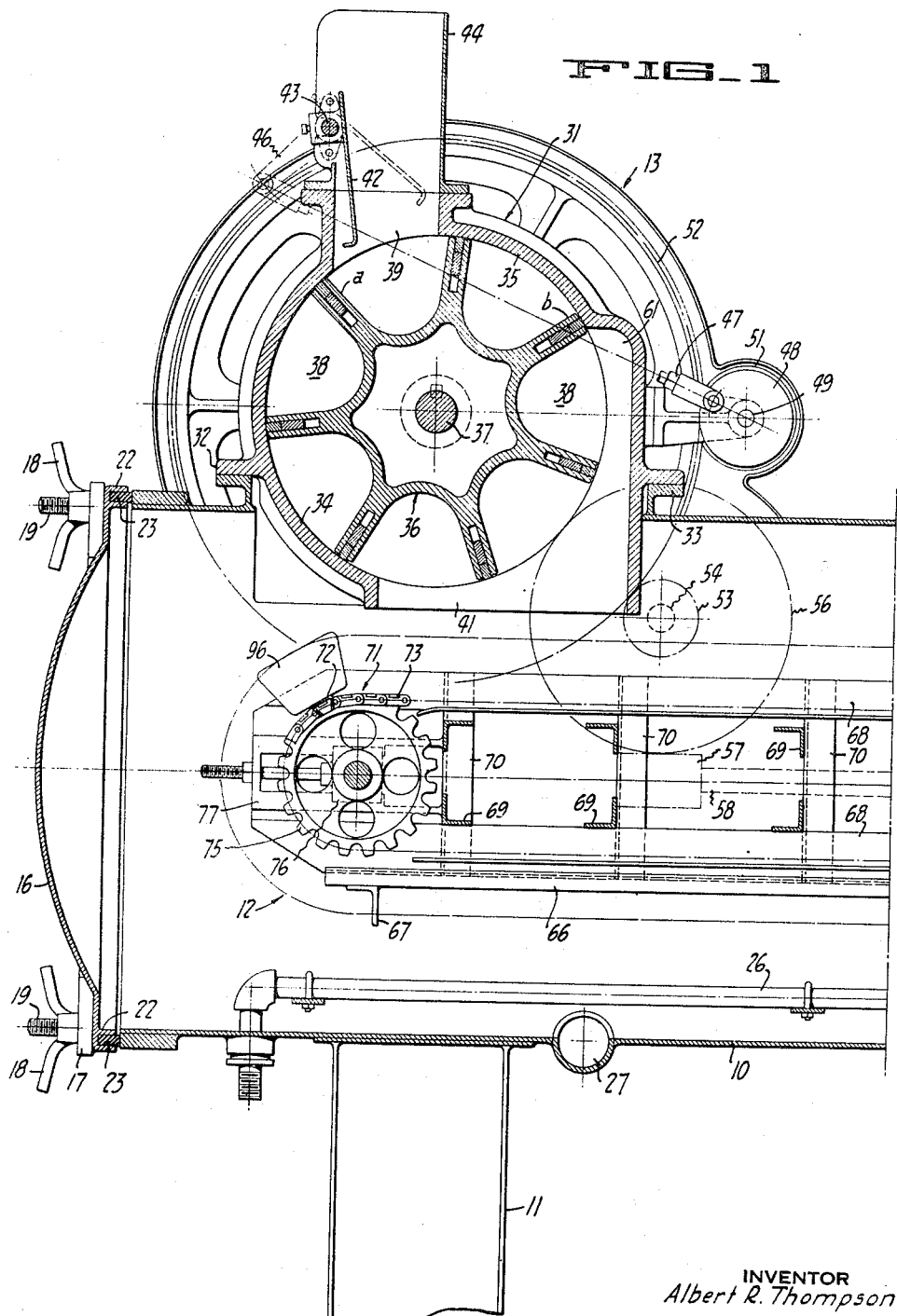
INVENTOR
Albert R. Thompson
BY Philip G. Minnis
ATTORNEY

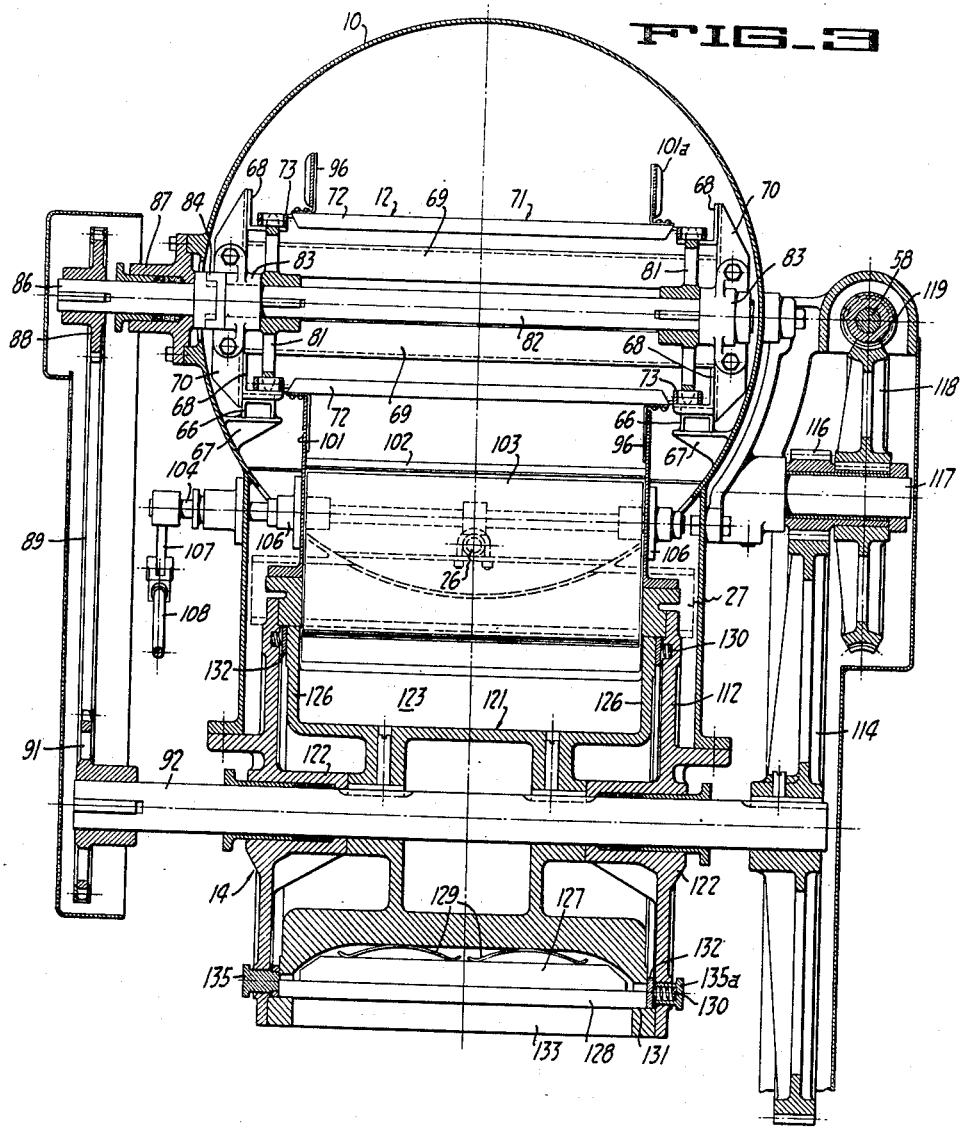

May 8, 1951  A. R. THOMPSON  2,551,981
CONVEYER MECHANISM FOR PRESSURE COOKERS
Original Filed April 20, 1942  4 Sheets-Sheet 3
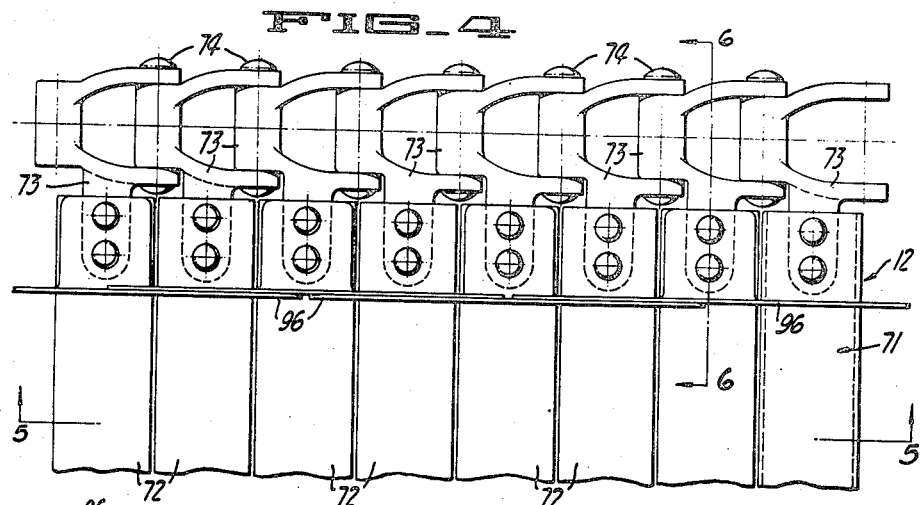
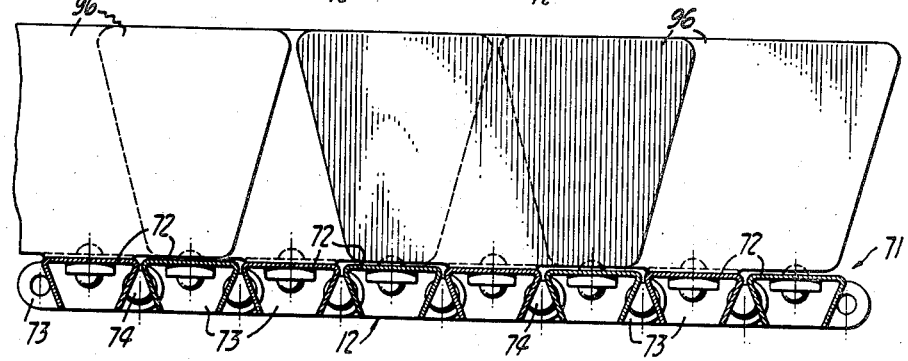
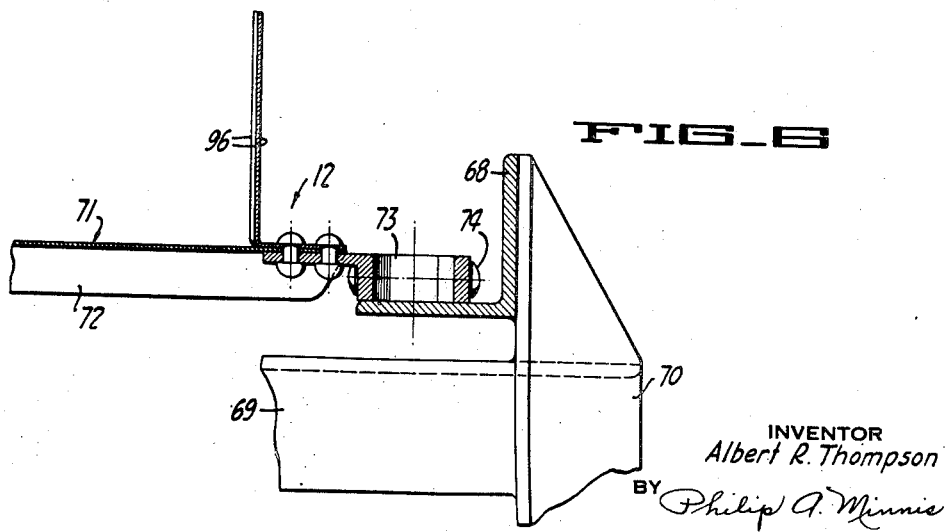
INVENTOR
Albert R. Thompson
BY Philip A. Minnis
ATTORNEY

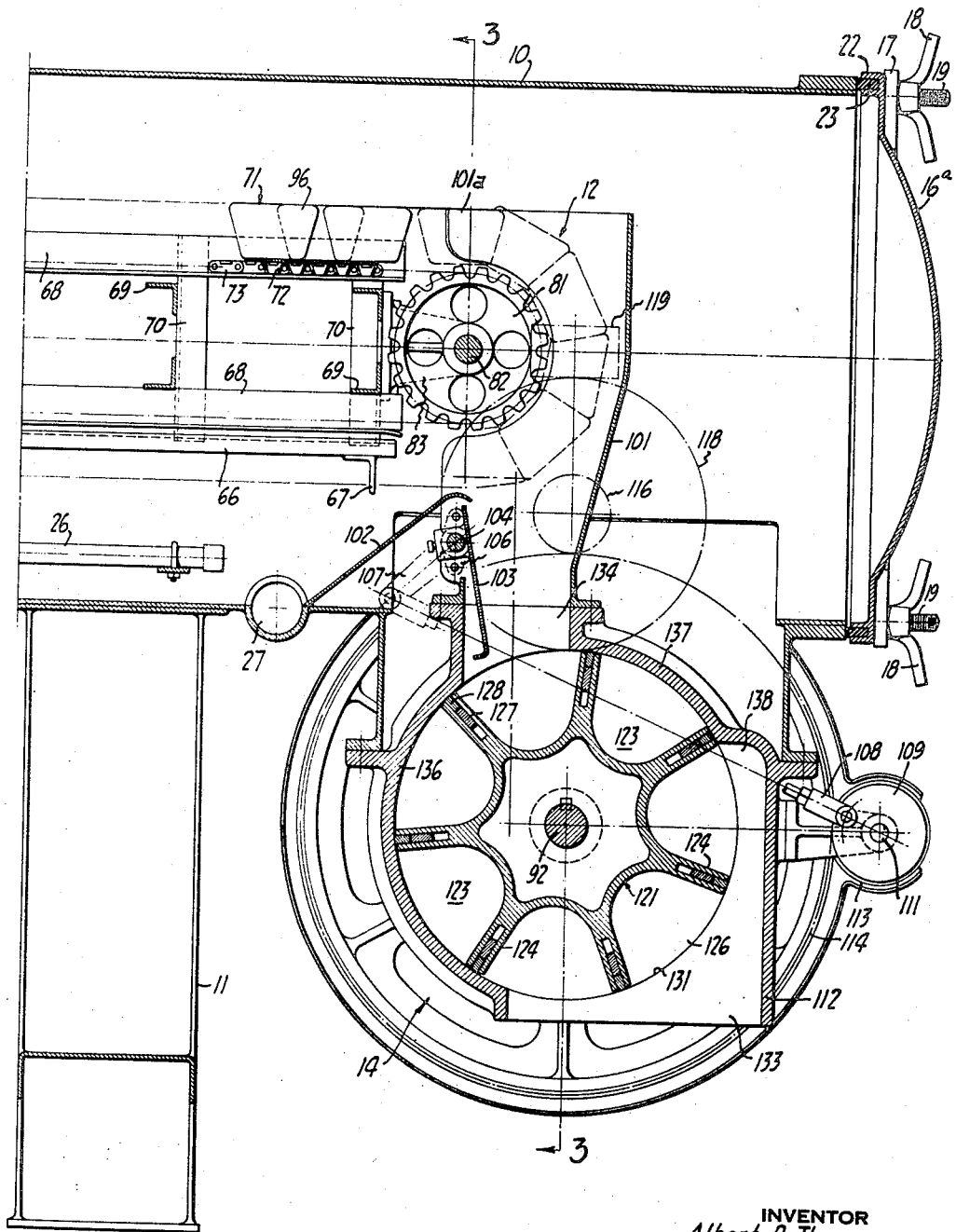

Patented May 8, 1951

2,551,981

UNITED STATES PATENT OFFICE 2,551,981

CONVEYER MECHANISM FOR PRESSURE COOKERS

Albert R. Thompson, Los Gatos, Calif., assignor to Food Machinery and Chemical Corporation, a corporation of Delaware Original application April 20, 1942, Serial No. 439,738, now Patent No. 2,389,330, dated November 20, 1945. Divided and this application June 18, 1945, Serial No. 600,051

5 Claims. (Cl. 198—45)

This invention relates to pressure cookers and is concerned more particularly with the provision of an improved pressure cooker adapted for use in the processing of dried fruit such as prunes.

This application is a division of my copending application for Valve Mechanism for Pressure Cooker which was filed in the United States Patent Office April 20, 1942, Serial No. 439,738, now Patent No. 2,389,330 granted November 20, 1945.

It is a general object of the invention to provide a pressure cooker for use in treating or processing dried prunes wherein the prunes are subjected to steam under pressure for a desired interval of time.

Another object of the invention is to provide a pressure cooker of the character referred to which is constructed to avoid gumming or sticking of the parts because of the sticky character of the fruit handled.

Another object of the invention is to provide an improved form of conveyor which will handle sticky fruits such as prunes without becoming gummed and without requiring frequent cleaning or servicing.

Another object of the invention is to provide an improved cooker wherein the mechanism for conveying the prunes is removably mounted within the cooker.

Another object of the invention is to provide an improved cooker having a conveyor slidably mounted therewithin for installation and removal and adapted to be operated from the discharge valve operating mechanism by a driving connection detachable from the cooker.

Other objects and advantages of the invention will be apparent from the following description of a preferred embodiment thereof, as illustrated in the accompanying drawings, in which:

Fig. 1 is a vertical longitudinal sectional view through the intake valve of the cooker;

Fig. 2 is a similar sectional view through the discharge valve of the cooker;

Fig. 3 is a transverse sectional view through the discharge valve of the cooker as indicated by the line 3—3 of Fig. 2;

Fig. 4 is a plan view of a portion of the draper;

Fig. 5 is a vertical longitudinal sectional view taken along the line 5—5 of Fig. 4; and Fig. 6 is a vertical transverse sectional view taken along the line 6—6 of Fig. 4.

The figures illustrate that portion of a pressure cooker necessary to show the structure of the present invention, a complete disclosure of the pressure cooker being contained in my said copending application, Serial No. 439,738, of which the present application is a division, reference being made thereto for a detail disclosure of the pressure cooker.

Referring to Figs. 1 and 2, the cooker includes a casing 10 which may be supported by suitable standards 11. The casing 10 encloses a draper or conveyor indicated generally at 12 to which the prunes are fed by intake valve mechanism indicated generally at 13. The discharge end of the conveyor is associated with a similar discharge valve mechanism 14. The valve mechanisms 13 and 14 are similar and will be described in detail hereinafter.

The casing 10 is generally cylindrical in form and is closed at its ends by similar covers 16, 16a. To detachably secure the covers in place, each cover is provided with a plurality of suitable brackets 17, each of which is engaged by a wing nut 18 threaded to a bolt 19 carried by the casing 10. A suitable sealing ring 23 may be provided in a recessed boss 22 of each of the covers to engage the casing to insure a tight joint.

Within the casing 10, a steam pipe 26 may be provided (Figs. 1 and 2) to which steam under pressure may be supplied if desired with a suitable thermostat control (not shown). Suitable cleanout pipes may be provided in the lower portion of casing 10.

At the feed end of the cooker, the casing 10 is apertured to communicate with the housing 31 of the intake valve 13. Housing 31 has a suitable flange 32 which is supported upon and secured to a flanged support 33 suitably secured as by welding around an opening formed in the casing 10. The housing 31 includes a cylindrical wall 34 which receives a valve rotor 36 secured on transverse shaft 37 and having a series of transversely extending pockets 38.

The specific construction of the rotor 36 and its mounting is similar to that of the discharge valve 14 and will be described in connection with the latter valve. For the present, it is sufficient to understand that the pockets 38 successively register with a feed opening 39 and a discharge opening 41 and receive charges of prunes in a controlled manner from a timing valve 42 which is in the form of a gate secured on shaft 43 and extending the full length of the pockets 38. The shaft 43 is supported by suitable bearings on a feed hopper 44 which is secured on valve housing 31. Prunes are fed to the hopper 44 by suitable feed means such as a belt or shaker conveyor (not shown) which provides a relatively constant rate of feed.

The timing valve 42 operates to periodically open and close the feed opening 39 so that when a desired amount is deposited in a pocket 38, the feed of prunes is interrupted until the next pocket 38 is in position to receive prunes. This operation will be described in detail later.

To drive the timing valve 42, the shaft 43 carries an arm 46 (Fig. 1) which is connected by an adjustable link 47 with a drive disk 48 secured on shaft 49 suitably supported on housing 31.

Shaft 49 carries a pinion 51 meshing with a large gear 52 secured on shaft 37 and forming the drive gear for the valve rotor. Gear 52 meshes with a pinion 53 on shaft 54 which carries a worm gear 56 meshing with a suitable worm 57 on shaft 58. The shaft 58 extends through the wall of the cooker 10. Shaft 58 which is disposed in suitable spaced relation to the exterior of the cooker, extends lengthwise of said cooker, as shown in Figs. 1 and 3, and is adapted to be driven from a variable speed motor or other source of power (not shown).

From the above description it will be seen that the valve 36 and drive disc 48 for the timing valve 42 are driven in a timed relation to each other and the timing is such that the timing valve 42 will operate once for each pocket 38. The parts are shown in Fig. 1 at the beginning of the stroke of the timing valve 42 which first travels slowly and just ahead of the rear wall of the adjacent pocket 38 and then more speedily until it approaches its closing position when it will slow down as it cuts off the flow of prunes. The flow of prunes is cut off before the rear wall $a$ of the pocket reaches the section 35 of the cylindrical wall to the right of the feed opening 39. Wall section 35 is of sufficient length so that the pocket engaged therewith is closed from both the feed and the discharge passages to maintain the pressure within the cooker.

Discharge of the prunes from the pockets 38 is facilitated by a recessed portion 61 in housing 31 whose height is such with respect to the shape of the pocket 38 that no prunes will contact the wall 35 before the leading edge of the pocket reaches the recessed portion 61.

The prunes from the feed pockets 38 are discharged onto the conveyor or draper 12. The draper assembly 12 is constructed as a unit and is removably mounted within the housing so as to be readily installed and withdrawn therefrom as necessary for repair or cleaning. For this purpose, the casing 10 is provided with opposite parallel tracks 66 (Fig. 3) in the form of inverted channel irons mounted on suitable brackets 67 and secured thereon as by welding. The tracks 66 extend lengthwise of the casing 10 being spaced a suitable distance inwardly from the interior wall of said casing. As shown in Fig. 3, the draper frame includes upper and lower longitudinal angles 68 which are connected by suitable cross angles 69 and upright angles 70 (see also Figs. 1 and 2). The lower longitudinal angles 68 of the draper frame rest upon the tracks 66.

Mounted for movement on the draper frame is a draper 71 which comprises a series of substantially U-shaped cross bars 72 (Figs. 4 and 5). Each cross bar 72 has its ends riveted to respective links of a pair of opposite chains. Adjacent links 73 of each chain are joined by a pivotal connecting pin 74. The bars 72 are connected at a central point intermediate the adjacent pivots 74 of the chain so that the space between a pair of adjacent bars 72 coincides with the pivotal axis of the pins 74 for the chain links 73 to which such bars are connected. The flanges of the U-shaped bars 72 are preferably converging as shown in Fig. 5 so that the bars can move around the curved paths at the ends of the draper without interference.

As shown in Fig. 1 the drive chains are engaged at one end by a pair of idler sprockets 75 journalled in suitable bearings 76 adjustably mounted in guides 77 on the draper frame. The drive chains are engaged at their drive end by drive sprockets 81 (Figs. 2 and 3) secured on a shaft 82 journalled in suitable bearings 83 on the draper frame. As seen in Fig. 3, the shaft 82 has an endwise releasable drive coupling 84 with a stub-drive shaft 86 suitably journalled in a bearing 87 removably secured on the exterior of the casing 10. Shaft 86 extends outwardly from the exterior of the casing 10 and carries a sprocket 88 which is driven through chain 89 from a sprocket 91 on shaft 92 referred to hereinafter.

Because of the releasable drive coupling 84, the draper can be removed from the casing by removing the bearing 87 with the shaft 86 and by also removing the cover 16 at the intake end of the casing. After which the entire draper assembly can be withdrawn endwise from the casing.

Means are provided for confining the fruit to the width of the draper as it is carried thereby. For this purpose, alternate links 73 of the chain each carry a wing 96 (Figs. 4, 5 and 6) which converge from the top downwardly as seen in Fig. 5. The bottom portion of each wing extends across the two adjacent bars 72 so that as the bars pass around the sprockets at the ends of the draper, the unfolding of the wings 96 still presents a solid wall to prevent sidewise fall of the fruit from the conveyor. This condition is seen in Fig. 2.

From the conveyor, the prunes are discharged through a discharge hopper 101 (Fig. 2) which is supported from the housing of the discharge valve mechanism and projects upwardly therefrom within the interior of the casing 10 of the cooker. The main body of the hopper 101 is U-shaped and has its parallel sides cut away to conform to the end of the draper with flared portions 101a to receive and guide the wings 96. A timing valve or gate 103 is provided in the hopper 101 which is similar to the timing valve 42. A guard 102 is fixed to the casing 10 at the open side of the hopper 101. The timing valve 103 is secured on a shaft 104 having its bearings 106 carried by the side walls of the hopper 101. The shaft 104 carries an arm 107 which is pivotally connected to an adjustable link 108 having its other end pivotally secured to a drive disc 109 on shaft 111. Shaft 111 is carried by suitable brackets on the housing 112 of the discharge valve.

Shaft 111 (Fig. 2) carries a pinion 113 which meshes with a large gear 114 (Figs. 4 and 5) on shaft 92. Gear 114 meshes with a drive pinion 116 on shaft 117 which carries a worm wheel 98 driven from worm 118 on shaft 58.

Arranged to receive prunes from the timing valve 103 is a rotor or discharge valve 121 secured on shaft 92, shaft 92 being journalled in sealed bearings 122 of housing 112. The valve 121 is provided with a series of pockets 123 formed between radial walls 124 and end walls 126 of the rotor. The radial walls 124 are slotted to receive a pair of sealing vanes 127 and 128, (Fig. 2). As seen in Fig. 3, a plurality of compression springs 129 are disposed within the slotted walls 124 behind the inner vane whose ends are cutaway to conform to the contour of the slot. Pressure from the springs 129 is transmitted to the outer vane 128 whose ends extend into openings in the end walls 126 and ride on tracks 131 provided in the housing 112. A suitable lateral seal ring 132 of conventional split construction is provided at each side of the rotor at the ends of the vanes 128. Each ring 132 is held against rotation with the rotor by plug 135 having a pilot portion removably engaging an aperture in the ring. Each ring 132 is urged against the rotor 121 adjacent the upper portions thereof by springs 130 seated in suitable recesses in the housing. Against its lower portion the ring 132 is engaged by springs 130 seated in screw plugs 135a. Thus the space within the casing is sealed against escape of pressure through the feed opening 134, past the rotor and to discharge opening 133 (Fig. 2). Plug 135 when removed provides for endwise withdrawal of the vanes 128. Intake valve 13 is similarly constructed.

The housing 112 (Fig. 2) is provided with a cylindrical wall portion 136 over which the vanes travel in passing from the discharge to the feed opening and a cylindrical wall portion 137 over which the vanes travel in passing from the feed opening 134 toward a recessed portion 138 of the housing. The recessed portion 138 provides an initial space for discharge of the prunes, from the pockets so that the prunes do not contact any of the wall space over which the vanes 128 travel in sealing relation. This relationship is true in both the intake valve and discharge valve which are similarly constructed.

As shown best in Fig. 3, the shaft 92 extends beyond the side walls of the housing 112. Sprocket 91 is fixed to one end of shaft 92 and the gear 114 is fixed to the other end of said shaft. The shaft 117 is supported by a suitable bearing carried by a bracket secured to the exterior of the casing 10 of the cooker. The bracket also supports the shaft 58 and the worm 119 at the discharge end of the cooker.

From the foregoing it will be noted that the drive mechanisms for the intake valve 36, the discharge valve 121, and the draper 12 are located on the exterior of the casing 10, the shaft 82 of the draper drive mechanism being detachably coupled to the drive shaft 86 so that when it is desired to remove the draper from the casing 10 the only part of the apparatus requiring uncoupling is the shaft 86 from the shaft 82.

In operation, prunes are fed in a substantially constant manner to the feed hopper 44 (Fig. 1) past the intake timing valve 42 into the adjacent feed pocket 38 as the valve 36 rotates. The travel of the timing gate 42 is so related to the adjacent feed pocket that it always travels in front of the trailing wall a of the adjacent pocket until the gate reaches the position shown in dotted lines Fig. 1, where its lower edge is still spaced slightly from the adjacent wall of the hopper 44 to prevent further flow of prunes and at the same time avoid mashing of a prune caught between the gate and the hopper. The flow of prunes is cut off before the pocket is filled completely so that the wall a passes by the adjacent edge of the wall portion 35 without the possibility of any prunes being caught between the wall a and the edge of the wall 35.

As seen in Fig. 1 the adjacent walls of the pockets 38 to the right of the feed position are both in sealing engagement with respect to the wall 35 so that a seal is maintained at all times between the pressure space within the cooker and the feed opening 39. As the feed valve continues to travel, the leading wall b of a pocket will pass into registry with the recessed portion 61 of the housing before the inclination of the wall b becomes such as to cause the falling of any prunes from the pocket against the wall 35. The prunes, therefore, drop from the feed rotor on bars 72 of the draper between the wings 96. The draper carries the prunes through an atmosphere of steam under pressure for subsequent discharge from the cooker.

As seen in Fig. 2, as the prunes fall from the discharge end of the draper into the hopper 101 their entry into the pockets 123 of the discharge valve 121 is controlled by the timing valve 103 which operates in the same timed relation with respect to the pockets 123 as described in connection with the feed valve. In connection with this timing, it is especially to be noted that at its extreme left-hand position the timing valve 103 will first move slowly, then be accelerated and again move slowly by virtue of the relation of its drive link 108 to the disc 109 as it travels with the leading wall of the cooperating pocket, so that there is in effect a dwell at the end of the filling operation of each pocket during which the timing valve 103 is so positioned as to prevent injury to the prunes. During this dwell, the trailing wall of the pocket passes into engagement with the wall 137 to cut off the pocket from communication and the return travel of the timing valve 103 permits the discharge of any accumulated prunes into the next oncoming pocket.

Having thus described my invention, what I claim and desire to secure by Letters Patent is:

1. A cooker comprising a casing, a removable cover for closing an end of the casing, a draper slidably mounted within said casing for installation and removal when said cover is removed from the end of the casing, an intake valve located adjacent the end of said casing through which the draper is adapted to be installed, a discharge valve located adjacent the opposite end of the draper, and a hopper in said casing extending upwardly from the discharge valve and having an opening in its end wall adjacent the inner end of the draper and its side walls cut away to conform to the inner end of the draper for receiving the same during installation and for directing material discharged from said draper toward said discharge valve.

2. A cooker comprising a casing, a removable cover for closing an end of the casing, a track extending lengthwise of the interior of the casing, a frame mounted on said track for installation and removal by sliding movement along said track when said cover is removed from the end of the casing, a draper carried by said frame and movable into and out of said casing with the frame, a feed valve located adjacent the end of said casing through which the draper is adapted to be installed within the casing, a discharge valve located at the opposite end of said casing, and means extending upwardly from said discharge valve within the interior of and stationary with respect to said casing for surrounding the inner end of the draper for directing material discharged from said draper toward said discharge valve, said last named means comprising a U-shaped hopper having its parallel sides so configurated as to receive the inner end of said draper during installation of the draper into the casing and to provide sidewall guides for the draper during operation of the same.

3. A cooker comprising a casing, a removable cover for closing an end of the casing, a draper slidably mounted within said casing for installation and removal when said cover is removed from the end of the casing, said draper comprising a pair of parallel chains constituting articulated links, a bar extending between each opposite pair of links, side wings carried by said bars and overlapping longitudinally of the draper to confine the material to the draper as the draper turns around an end portion of its path, an intake valve located adjacent the end of said casing through which the draper is adapted to be installed in the casing, a discharge valve located adjacent the opposite end of the draper, and a hopper fixedly mounted within said casing and having a wall to receive and guide the wings of said draper, said hopper being arranged to direct the material discharged from said draper toward said discharge valve.

4. A cooker comprising a casing, a draper removably mounted within said casing, longitudinally overlapping side wings mounted on said draper to confine the material to said draper throughout its entire transporting path, intake and discharge valves adjacent the opposite ends of said casing, and means in said casing for directing the material discharged from said draper toward said discharge valve, said means including opposed outwardly flared side walls to receive and guide the wings of said draper when the latter is inserted into said casing.

5. A cooker comprising a casing, a draper removably mounted within said casing, said draper comprising a pair of endless parallel chains each constituting articulated links, a bar extending between each opposite pair of links, side wings carried on opposite ends of said bars and overlapping longitudinally of the draper to confine the material to the draper as the draper turns around a curved end portion of its path, an intake valve adjacent one end of said casing, a discharge valve adjacent the other end of said casing, and means mounted in said casing for directing the material discharged from said draper toward said discharge valve, said material directing means including opposed outwardly flared side walls for receiving and guiding the side wings of said draper when the latter is inserted into said casing.

ALBERT R. THOMPSON.

REFERENCES CITED

The following references are of record in the file of this patent:

UNITED STATES PATENTS

| Number | Name | Date |
|---|---|---|
| 734,880 | Jorgensen et al. | July 28, 1907 |
| 1,306,835 | Pennock | June 17, 1919 |
| 1,408,429 | Anderson et al. | Mar. 7, 1922 |
| 1,922,783 | Schmidt | Aug. 15, 1933 |
| 2,213,623 | Choppin et al. | Sept. 3, 1940 |

FOREIGN PATENTS

| Number | Country | Date |
|---|---|---|
| 370,518 | Great Britain | Apr. 14, 1932 |